United States Patent
Moon et al.

(10) Patent No.: US 12,380,697 B2
(45) Date of Patent: *Aug. 5, 2025

(54) APPARATUS AND METHOD FOR ACTION DETECTION

(71) Applicant: ELECTRONICS AND TELECOMMUNICATIONS RESEARCH INSTITUTE, Daejeon (KR)

(72) Inventors: Jin-Young Moon, Daejeon (KR); Sun-Ah Min, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 368 days.

This patent is subject to a terminal disclaimer.

(21) Appl. No.: 17/890,750

(22) Filed: Aug. 18, 2022

(65) Prior Publication Data
US 2023/0073298 A1 Mar. 9, 2023

(30) Foreign Application Priority Data
Sep. 8, 2021 (KR) .................. 10-2021-0119669

(51) Int. Cl.
*G06V 20/40* (2022.01)
(52) U.S. Cl.
CPC .............. *G06V 20/46* (2022.01); *G06V 20/44* (2022.01); *G06V 20/49* (2022.01)
(58) Field of Classification Search
None
See application file for complete search history.

(56) References Cited

U.S. PATENT DOCUMENTS

| 10,970,598 B1 | 4/2021 | Ryu et al. |
| 2004/0119716 A1 | 6/2004 | Park et al. |
| 2013/0202210 A1 | 8/2013 | Ryoo et al. |

(Continued)

FOREIGN PATENT DOCUMENTS

| KR | 10-2014-0110484 | 9/2014 |
| KR | 10-1563297 | 10/2015 |

(Continued)

OTHER PUBLICATIONS

H. Eun, J. Moon, J. Park, C. Jung and C. Kim, "Learning to Discriminate Information for Online Action Detection," 2020 IEEE/CVF Conference on Computer Vision and Pattern Recognition (CVPR), Seattle, WA, USA, 2020, pp. 806-815, doi: 10.1109/CVPR42600.2020.00089. (Year: 2020).*

*Primary Examiner* — Jennifer Mehmood
*Assistant Examiner* — Promotto Tajrian Islam
(74) *Attorney, Agent, or Firm* — KILE PARK REED & HOUTTEMAN PLLC

(57) ABSTRACT

Disclosed herein are a method and apparatus for action detection. The method for action detection includes extracting chunk-level features for respective video frame chunks from a streaming video ranging from a past time point to a current time point, based on RGB frames, generating elevated feature information based on a chunk-level feature corresponding to the current time point for each of the video frame chunks, and detecting an action corresponding to the current time point based on the elevated feature information.

16 Claims, 7 Drawing Sheets

(56) References Cited

U.S. PATENT DOCUMENTS

| | | |
|---|---|---|
| 2019/0108399 A1 | 4/2019 | Escorcia et al. |
| 2020/0302236 A1* | 9/2020 | Gao .................... G06F 18/2415 |
| 2021/0142063 A1 | 5/2021 | Moon et al. |
| 2022/0067382 A1 | 3/2022 | Moon et al. |
| 2022/0180057 A1* | 6/2022 | Garcia Santa ......... G06N 3/084 |
| 2023/0395094 A1* | 12/2023 | Ding ....................... G10L 25/45 |

FOREIGN PATENT DOCUMENTS

| | | |
|---|---|---|
| KR | 10-1675692 | 11/2016 |
| KR | 10-2019-0054702 | 5/2019 |
| KR | 10-2021-0055532 | 5/2021 |
| KR | 10-2021-0100937 | 8/2021 |
| KR | 10-2022-0026127 | 3/2022 |

\* cited by examiner

FIG. 6

| INPUT | METHOD | FEATURE EXTRACTOR | mAP(%) |
|---|---|---|---|
| RGB | TFN [5] | TS-RGB[17] | 45.5 |
| | OURS | TSM-RGB [14] | 60.4 |
| RGB+FLOW | RED [2] | TS [17] | 45.3 |
| | TRN [3] | | 47.2 |
| | IDN [4] | | 50.0 |
| | TFN [5] | | 55.7 |

APPARATUS AND METHOD FOR ACTION DETECTION

CROSS REFERENCE TO RELATED APPLICATION

This application claims the benefit of Korean Patent Application No. 10-2021-0119669, filed Sep. 8, 2021, which is hereby incorporated by reference in its entirety into this application.

BACKGROUND OF THE INVENTION

1. Technical Field

The present invention relates generally to action detection technology, and more particularly to technology that rapidly extracts video features from a streaming video ranging from a past time point to a current time point using only RGB frames and accurately detects an action corresponding to the current time point using relevancy to features at the current time point.

2. Description of the Related Art

Because online action detection technology in a streaming video detects an action at the current time point using visual information from the past to the present, rather than the entire video, information related to the action at the current time point is considered to be important. Therefore, in order to accurately detect an online action in a streaming video, there is required technology for maximally maintaining visual information related to the current action, among pieces of visual information ranging from the past to the present, which are received as input, by elevating the visual information, thus preventing the visual information from being forgotten.

Also, existing networks use RGB frames and optical flow to extract features from a video. However, in order to extract optical flow, a lot of time and memory are required. This requirement impedes application to the real world, and thus technology for rapidly detecting an online action without using optical flow is required.

PRIOR ART DOCUMENTS

Patent Documents (Patent Document) Korean Patent Application Publication No. 10-2019-0054702, Date of publication: May 22, 2019 (Title: Method and Apparatus for Detecting Action of Object in Stream)

SUMMARY OF THE INVENTION

Accordingly, the present invention has been made keeping in mind the above problems occurring in the prior art, and an object of the present invention is to efficiently and effectively perform action detection based on features extracted using only RGB frames, excluding the use of optical flow, which requires large amounts of memory and time to extract visual information.

Another object of the present invention is to provide a method that performs fast and accurate temporal action modeling in an untrimmed streaming video including a background so as to rapidly and accurately detect the current action in the streaming video, and that elevates information about visual information related to the current action in an input video interval so as to implement fast and accurate temporal action modeling.

A further object of the present invention is to effectively predict an action at a current time point by elevating features related to the current time point in consideration of relevancy to a chunk at the current time point.

In accordance with an aspect of the present invention to accomplish the above objects, there is provided a method for action detection, including extracting chunk-level features for respective video frame chunks from a streaming video ranging from a past time point to a current time point, based on RGB frames; generating elevated feature information based on a chunk-level feature corresponding to the current time point for each of the video frame chunks; and detecting an action corresponding to the current time point based on the elevated feature information.

Extracting the chunk-level features may include dividing the streaming video into units of video segments having a fixed length; dividing each video segment into units of video frame chunks having a fixed length; and generating the chunk-level features for respective video frame chunks, and embedding the chunk-level features into respective video frame chunks.

Each video segment may include T+1 video frame chunks including T video frame chunks corresponding to the past time point and one video frame chunk corresponding to the current time point.

Extracting the chunk-level features may further include generating a single-chunk feature for each of the video frame chunks based on RGB frames extracted from the corresponding video segment, and generating a chunk-level feature sequence using T+1 single-chunk features corresponding to time points from the past time point to the current time point.

Generating the elevated feature information may include generating a chunk-level feature sequence elevated in accordance with an action instance at the current time point by sequentially inputting the T+1 single-chunk features corresponding to the chunk-level feature sequence, together with the single-chunk feature corresponding to the current time point, into information elevation units and by cyclically processing the input chunk features.

Detecting the action may include calculating probabilities for respective action classes for each of the T+1 video frame chunks by inputting the elevated chunk-level feature sequence into an action detection model; and outputting an action corresponding to the current time point in conformity with the probabilities for respective action classes of the video frame chunk corresponding to the current time point.

The action detection model may be trained by applying cross entropy loss to each of the T+1 video frame chunks.

The elevated chunk-level feature sequence may correspond to a chunk-level hidden state sequence including elevated feature information generated in accordance with each of the T+1 single-chunk features.

The action detection model may detect the action in accordance with an action class having a highest value, among probabilities for respective action classes for a value corresponding to the current time point in the chunk-level hidden state sequence.

In accordance with another aspect of the present invention to accomplish the above objects, there is provided an apparatus for action detection, including a processor for extracting chunk-level features for respective video frame chunks from a streaming video ranging from a past time point to a current time point, based on RGB frames, generating elevated feature information based on a chunk-level feature corresponding to the current time point for each of the video frame chunks, and detecting an action corresponding to the current time point based on the elevated feature information; and a memory for storing the streaming video and the check-level features for respective video frame chunks.

The processor may be configured to divide the streaming video into units of video segments having a fixed length, divide each video segment into units of video frame chunks having a fixed length, generate the chunk-level features for respective video frame chunks, and embed the chunk-level features into respective video frame chunks.

Each video segment may include T+1 video frame chunks including T video frame chunks corresponding to the past time point and one video frame chunk corresponding to the current time point.

The processor may be configured to generate a single-chunk feature for each of the video frame chunks based on RGB frames extracted from the corresponding video segment, and generate a chunk-level feature sequence using T+1 single-chunk features corresponding to time points from the past time point to the current time point.

The processor may be configured to generate a chunk-level feature sequence elevated in accordance with an action instance at the current time point by sequentially inputting the T+1 single-chunk features corresponding to the chunk-level feature sequence, together with the single-chunk feature corresponding to the current time point, into information elevation units and by cyclically processing the input chunk features.

The processor may be configured to calculate probabilities for respective action classes for each of the T+1 video frame chunks by inputting the elevated chunk-level feature sequence into an action detection model and to output an action corresponding to the current time point in conformity with the probabilities for respective action classes of the video frame chunk corresponding to the current time point.

The action detection model may be trained by applying cross entropy loss to each of the T+1 video frame chunks.

The elevated chunk-level feature sequence may correspond to a chunk-level hidden state sequence including elevated feature information generated in accordance with each of the T+1 single-chunk features.

The action detection model may detect the action in accordance with an action class having a highest value, among probabilities for respective action classes for a value corresponding to the current time point in the chunk-level hidden state sequence.

BRIEF DESCRIPTION OF THE DRAWINGS

The above and other objects, features and advantages of the present invention will be more clearly understood from the following detailed description taken in conjunction with the accompanying drawings, in which:

FIG. 6 is a diagram illustrating an example of a comparison between action detection performance of conventional technology and action detection performance according to the present invention.

DESCRIPTION OF THE PREFERRED EMBODIMENTS

Figure 1:
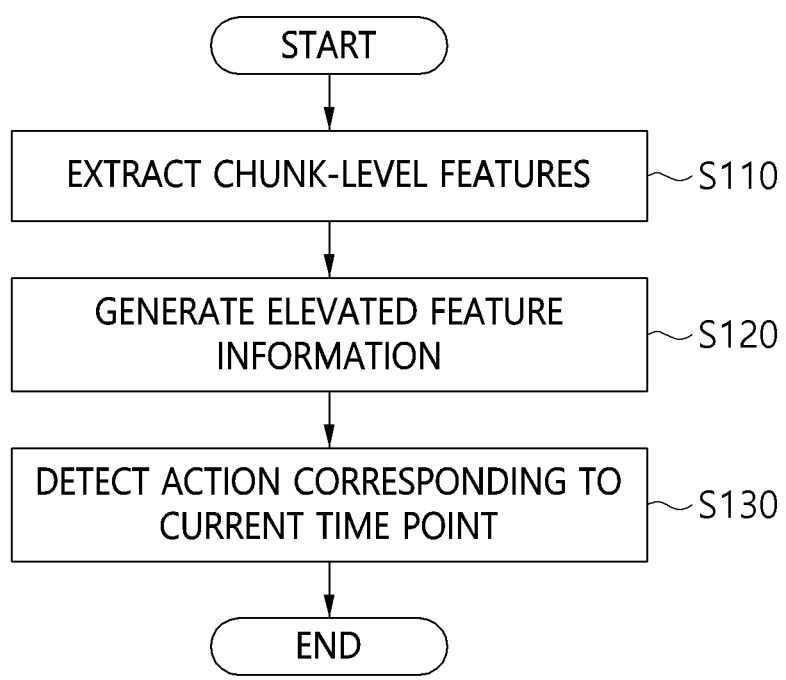
FIG. 1 is an operation flowchart illustrating a method for action detection according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

Conventional action detection technologies are problematic in that the features of an untrimmed video in which a background and various action instances coexist are not sufficiently utilized, thus greatly deteriorating performance. Also, because optical flow is used to acquire motion information even when the features of video frame chunk levels are extracted, large amounts of memory and time are inevitably consumed in applying conventional action detection technologies to the real world.

Therefore, the present invention is intended to propose technology for more rapidly and accurately detecting or predicting an action by elevating feature information related to a current time point while utilizing features that do not use optical flow in order to more rapidly implement action detection.

For example, the action detection technique covered by the present invention may be online action detection, action detection for a streaming video, and the like.

FIG. 1 is an operation flowchart illustrating a method for action detection according to an embodiment of the present invention.

Referring to FIG. 1, the action detection method according to an embodiment of the present invention extracts chunk-level features for respective video frame chunks from a streaming video ranging from past time points (the past) to a current time point, based on RGB frames, at step S110.

Here, the streaming video may be divided into units of video segments having a fixed length, each video segment may be divided into units of video frame chunks having a fixed length, and chunk-level features may be generated for respective video frame chunks, and may be embedded into corresponding video frame chunks.

Here, each video segment may be composed of T+1 video frame chunks including T video frame chunks, corresponding to the past, and one video frame chunk, corresponding to the current time point.

Here, a single-chunk feature for each video frame chunk may be generated based on the RGB frames extracted from the corresponding video segment, and a chunk-level feature sequence may be generated using T+1 single-chunk features corresponding to the time points from the past time points to the current time point.

Figure 2:
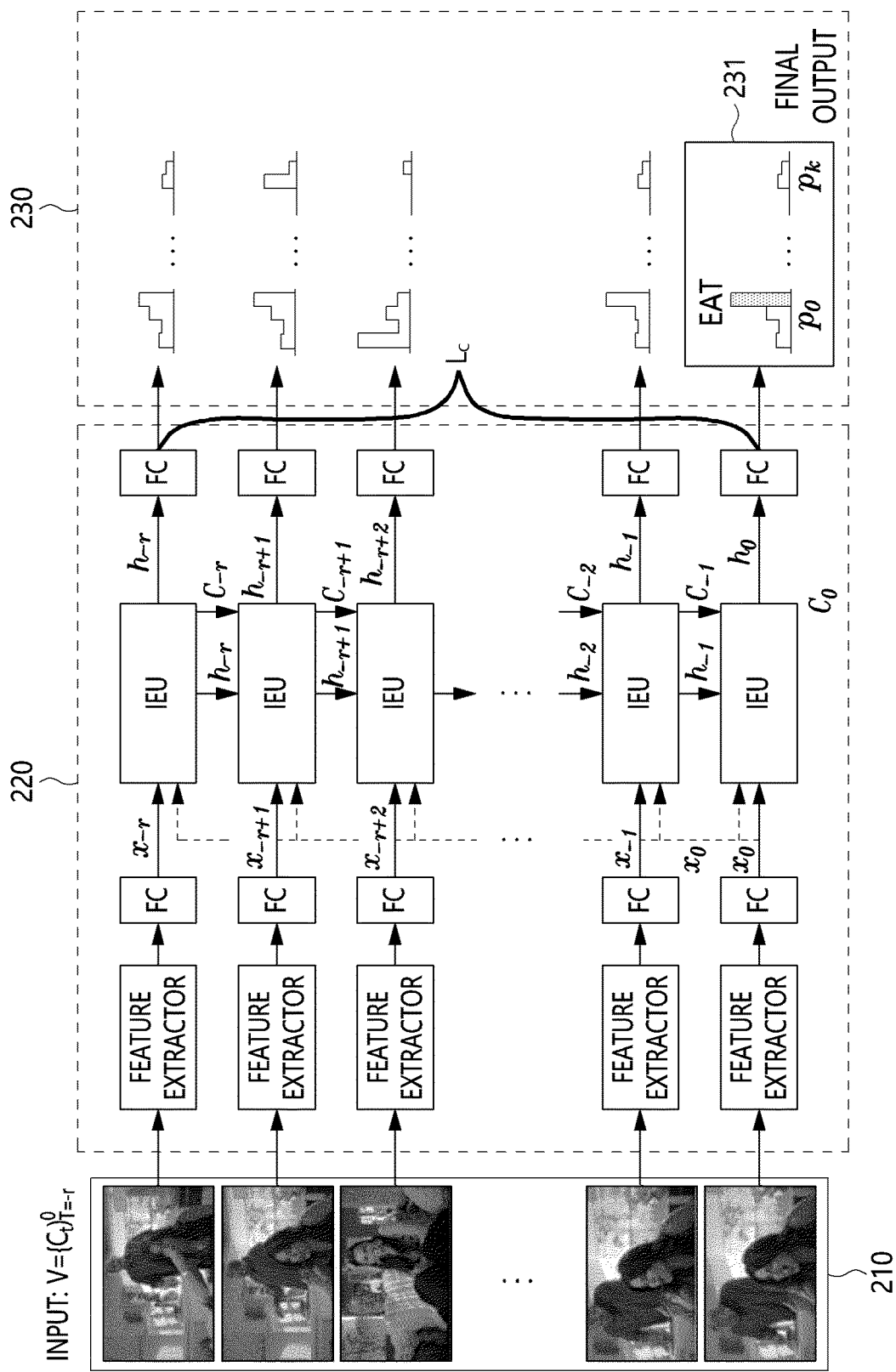
FIG. 2 is a diagram illustrating an example of an action detection process according to the present invention.

For example, FIG. 2 illustrates an action detection process according to the present invention. In detail, when T+1 video frame chunks 210 are individually input into an action detection module 220, each of feature extraction modules (i.e., feature extractors) in the action detection module 220 may extract a single-chunk feature for a corresponding one of the T+1 video frame chunks 210.

Figure 3:
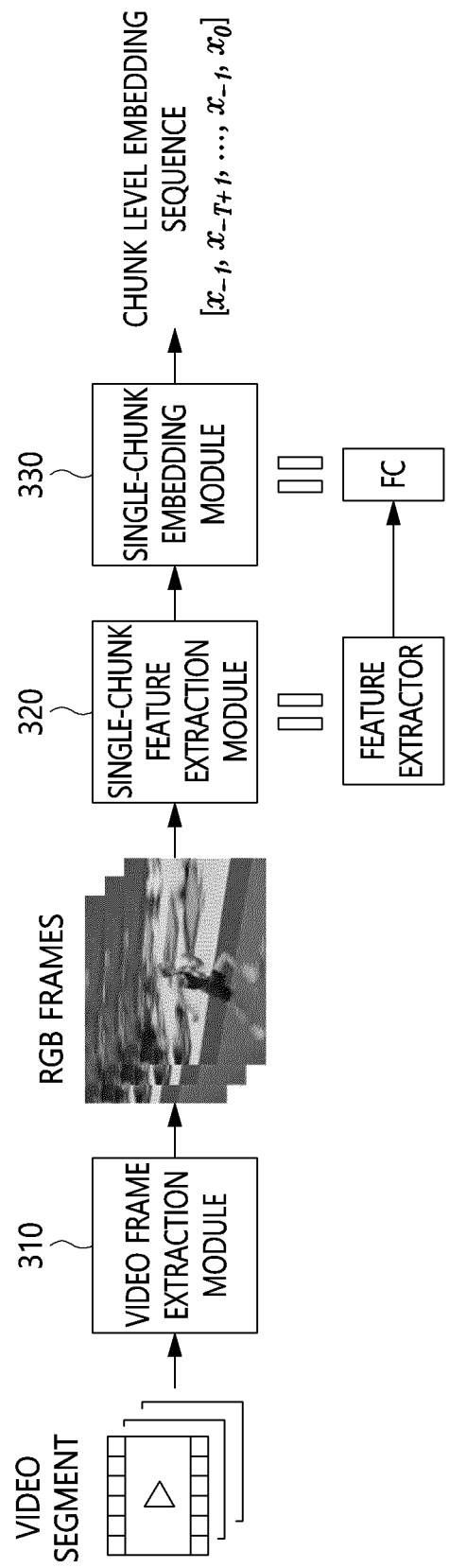
FIG. 3 is a diagram illustrating an example in which a chunk-level feature sequence is generated according to the present invention.

Here, a process of extracting each single-chunk feature may be performed, as illustrated in FIG. 3.

Referring to FIG. 3, RGB frames may be extracted by a video frame extraction module 310 from a video segment composed of T+1 video frame chunks either in each frame or through sampling.

Thereafter, a single-chunk feature may be generated for each video frame chunk based on the extracted RGB frames by a single-chunk feature extraction module 320.

Here, the single-chunk feature extraction module 320 may correspond to the feature extractor illustrated in FIG. 2.

Thereafter, the single-chunk feature for each video frame chunk generated by the single-chunk feature extraction module 320 may be provided by a single-chunk embedding module 330 in the form of an embedded shape.

Here, the single-chunk embedding module 330 may be configured and operated as a deep-learning neural network-based fully connected layer, a batch normalization layer, an exponential linear unit (ELU), or the like.

Thereafter, a chunk-level embedding sequence may be generated using embedded T+1 single-chunk features.

Here, conventional feature extraction modules are disadvantageous in that a lot of time and a large amount of memory are consumed because motion information is extracted using optical flow, together with extraction of information about RGB-based appearance. However, the present invention extracts features only RGB frames, as illustrated in FIG. 3, thus acquiring single-chunk features for respective video frame chunks without consumption of time and memory required for using optical flow.

Further, the action detection method according to the embodiment of the present invention generates elevated feature information based on the chunk-level features corresponding to the current time point for respective video frame chunks at step S120.

Here, a chunk-level feature sequence elevated in accordance with an action instance at the current time point may be generated by sequentially inputting the T+1 single-chunk features corresponding to the chunk-level feature sequence, together with the single-chunk features corresponding to the current time point, into information elevation modules (i.e., information elevation units: IEU) and by cyclically processing the input chunk features.

Here, the chunk-level feature sequence refers to the chunk level embedding sequence illustrated in FIG. 3, and both the chunk-level feature sequence and the chunk level embedding sequence are collectively designated and used as a "chunk-level feature sequence" for convenience of description.

Figure 4:
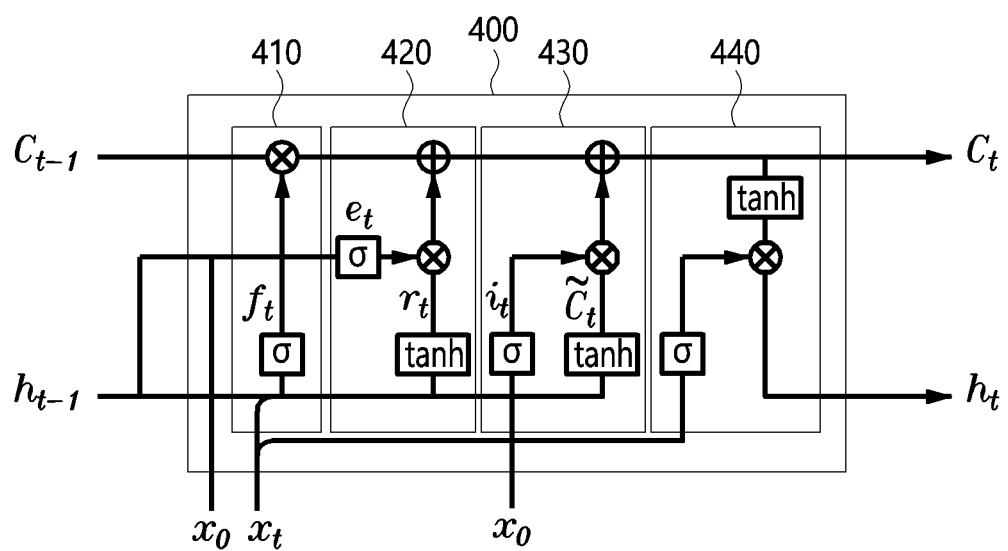
FIG. 4 is a diagram illustrating an example of an information elevation process (at a specific time point t) according to the present invention.

For example, each information elevation unit (IEU) may be operated in the form illustrated in FIG. 4.

Referring to FIG. 4, an information elevation unit (IEU) 400 at a specific time point t is illustrated. In detail, illustrated is a process of receiving and processing both a single-chunk feature $x_t$ at the specific time point t, among T+1 single-chunk features included in the chunk-level feature sequence, and a single-chunk feature $x_0$ corresponding to the current time point.

The information elevation module (information elevation unit) 400 may sequentially receive and process the T+1 single-chunk features included in the chunk-level feature sequence, and may be cyclically operated by receiving a processed value at a previous time point for processing at a subsequent time point.

The information elevation unit 400 may include a forget gate 410, an elevation gate 420, an input gate 430, and an output gate 440.

The forget gate 410 may be operated to forget features having low relevancy based on the past information $h_{t-1}$ and information $x_t$ at the specific time point t, and this procedure may be represented by the following Equation (1):

$$f_t = \sigma(W_f \cdot (h_{t-1} + x_t)) \tag{1}$$

Here, the past information $h_{t-1}$ may correspond to elevated information at a time point t−1, which is the time point just before the specific time point t.

The elevation gate 420 may generate elevated information for information related to the current time point by additionally providing information at the current time point together with the information at the specific time point t in consideration of the fact that pieces of information forgotten by the forget gate 410 may be information related to the current time point. This procedure is represented by the following Equation (2):

$$e_t = \sigma(W_e \cdot (h_{t-1} + x_0))$$
$$r_t = \tanh(W_r \cdot (h_{t-1} + x_t)) \tag{2}$$

The input gate 430 may determine and provide information $i_t$ to be newly added with reference to the past information $h_{t-1}$ and the information $x_t$ at the specific time point t, and this procedure is represented by the following Equation (3):

$$i_t = \sigma(W_i \cdot (x_t + x_0))$$
$$\tilde{C}_t = \tanh(W_c \cdot (h_{t-1} + x_t)) \tag{3}$$

The output gate 440 may determine pieces of information $C_t$ and $h_t$ to be transferred to a subsequent stage from context information in which all of the pieces of generated information are reflected, and this procedure is represented by the following Equation (4):

$$C_t = (C_{t-1} \times f_t) + (r_t \times e_t) + (\tilde{C}_t \times i_t)$$
$$o_t = \sigma(W_o \cdot (x_t + x_o))$$
$$h_t = o_t \times \tanh(C_t) \tag{4}$$

In this case, variables $W_f$, $W_e$, $W_r$, $W_c$, and $W_o$ used in respective equations may be learnable parameters, and may be learned and used to generate elevated feature information in a process in which the information elevation unit 400 sequentially receives and processes T+1 single-chunk features included in the chunk-level feature sequence.

Also, the action detection method according to the embodiment of the present invention detects an action corresponding to the current time point based on the elevated feature information corresponding to the current time point at step S130.

Here, probabilities for respective action classes may be calculated for respective T+1 video frame chunks by inputting the elevated chunk-level feature sequence into the action detection model.

For example, referring to FIG. 2, the action detection module 220 may generate action class classification results 230 for respective video frame chunks 210 using an internal action detection model. Here, the generated action class classification results 230 may correspond to probability values for respective action classes for each of video frame chunks.

Here, an action corresponding to the current time point may be output depending on probabilities for respective action classes of each video frame chunk corresponding to the current time point.

That is, referring to FIG. 2, the action detection module 220 calculates and outputs probabilities for respective action classes for each of T+1 video frame chunks, but the present invention aims to detect an action corresponding to the current time point. Accordingly, probabilities for respective action classes corresponding to the current time point may be acquired as the final output 231, and thus the action corresponding to the current time point may be detected or predicted.

Here, the elevated chunk-level feature sequence may correspond to a chunk-level hidden state sequence including pieces of elevated feature information that are generated to respectively correspond to T+1 single-chunk features.

Here, the action detection model may detect an action corresponding to the action class having the highest probability value, among probability values for respective action classes for a value corresponding to the current time point in the chunk-level hidden state sequence.

Figure 5:
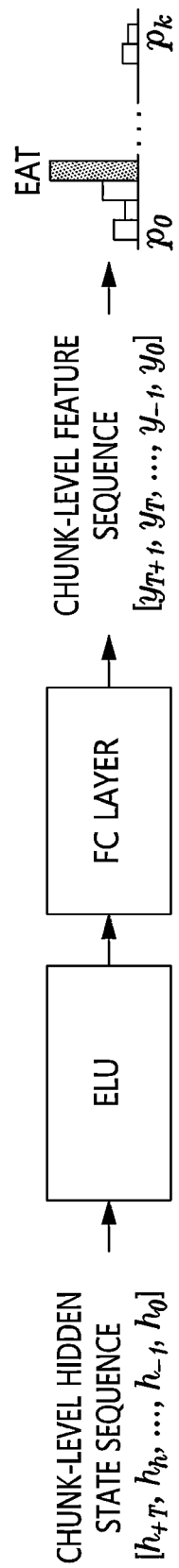
FIG. 5 is a diagram illustrating an example of an action classification process according to the present invention.

For example, FIG. 5 illustrates an action detection process based on the action detection model according to an embodiment of the present invention. Referring to FIG. 5, it can be seen that a chunk-level hidden state sequence is input into the action detection model so as to detect an action corresponding to the current time point.

Here, the chunk-level hidden state sequence corresponds to the output values for respective video frame chunks in the information elevation unit 400 illustrated in FIG. 4, and may indicate output values corresponding to the hidden layer of a deep learning network.

That is, because the information elevation unit 400 generates pieces of elevated feature information for respective video frame chunks using information related to single-chunk features corresponding to the current time point, the pieces of elevated feature information for respective video frame chunks may be maintained without losing features related to the current time point.

Therefore, when the chunk-level hidden state sequence including information related to the current time point is input into the action detection model, k+1 ($p_0$ to $p_k$) probabilities corresponding to the current time point for respective action classes, including action classes and a background, may be acquired.

Here, the action detection model may output an action class $y_0$ for the last chunk corresponding to the current time point, among the video frame chunks.

Here, the action detection model may be trained by applying cross entropy loss to each of T+1 video frame chunks.

For example, in order to train the action detection model according to an embodiment of the present invention, classification loss may be applied to K+1 action classes by exploiting cross entropy loss mainly used for classification. Here, entropy loss may be applied to each video frame chunk so that the hidden state of each video frame chunk is capable of including information about the action sequence.

When action detection is performed using this process, action detection performance higher than that in a scheme using RGB+optical flow, as well as a conventional scheme using RGB frames, may be obtained for a THUMOS-14 benchmark dataset, as illustrated in FIG. 6.

By means of the action detection method, action detection may be efficiently and effectively performed based on features extracted using only RGB frames, excluding the use of optical flow, which requires large amounts of memory and time to extract visual information.

Further, there can be provided a method that performs fast and accurate temporal action modeling in an untrimmed streaming video including a background to rapidly and accurately detect the current action in the streaming video, and that elevates information about visual information related to the current action in an input video interval so as to implement fast and accurate temporal action modeling.

Furthermore, an action at a current time point may be effectively predicted by elevating features related to the current time point in consideration of relevancy to a chunk at the current time point.

Figure 7:
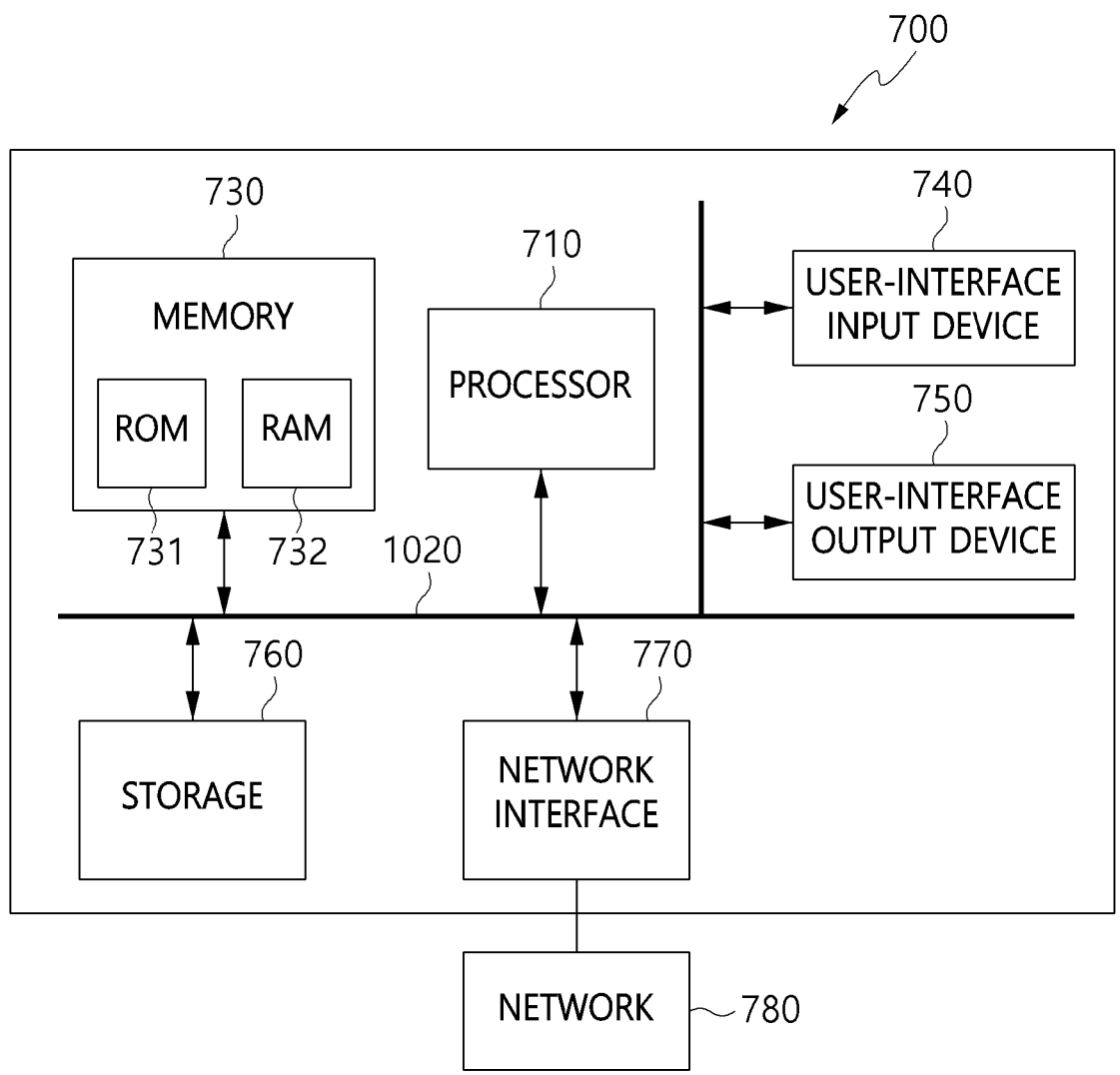
FIG. 7 is a block diagram illustrating an example of an apparatus for action detection according to an embodiment of the present invention.

FIG. 7 is a block illustrating an example of an apparatus for action detection according to an embodiment of the present invention.

Referring to FIG. 7, the action detection apparatus according to the embodiment of the present invention may be implemented in a computer system such as a computer-readable storage medium. As illustrated in FIG. 7, a computer system 600 may include one or more processors 710, memory 730, a user interface input device 740, a user interface output device 750, and storage 760, which communicate with each other through a bus 720. The computer system 700 may further include a network interface 770 connected to a network 780. Each processor 710 may be a Central Processing Unit (CPU) or a semiconductor device for executing processing instructions stored in the memory 730 or the storage 760. Each of the memory 730 and the storage 760 may be any of various types of volatile or nonvolatile storage media. For example, the memory 730 may include Read-Only Memory (ROM) 731 or Random Access Memory (RAM) 732.

Accordingly, an embodiment of the present invention may be implemented as a non-transitory computer-readable storage medium in which methods implemented using a computer or instructions executable in a computer are recorded. When the computer-readable instructions are executed by the processor, the computer-readable instructions may perform a method according to at least one aspect of the present invention.

The processor 710 extracts chunk-level features for respective video frame chunks from a streaming video ranging from past time points to a current time point, based on RGB frames.

Here, the streaming video may be divided into units of video segments having a fixed length, each video segment may be split into units of video frame chunks having a fixed length, and chunk-level features may be generated for respective video frame chunks and may be embedded into corresponding video frame chunks.

Here, each video segment may be composed of T+1 video frame chunks including T video frame chunks, corresponding to the past, and one video frame chunk, corresponding to the current time point.

Here, a single-chunk feature for each video frame chunk may be generated based on the RGB frames extracted from the corresponding video segment, and a chunk-level feature sequence may be generated using T+1 single-chunk features corresponding to the time points from the past time points to the current time point.

Further, the processor 710 generates elevated feature information based on the chunk-level features corresponding to the current time point for respective video frame chunks.

Here, a chunk-level feature sequence elevated in accordance with an action instance at the current time point may be generated by sequentially inputting the T+1 single-chunk features corresponding to the chunk-level feature sequence, together with the single-chunk features corresponding to the current time point, into information elevation modules (i.e., information elevation units: IEU) and by cyclically processing the input chunk features.

Furthermore, the processor 710 detects an action corresponding to the current time point based on the elevated feature information corresponding to the current time point.

Here, probabilities for respective action classes may be calculated for respective T+1 video frame chunks by inputting the elevated chunk-level feature sequence into the action detection model, and an action corresponding to the current time point may be output depending on probabilities for respective action classes of each video frame chunk corresponding to the current time point.

Here, the action detection model may be trained by applying cross entropy loss to each of T+1 video frame chunks.

Here, the elevated chunk-level feature sequence may correspond to a chunk-level hidden state sequence including pieces of elevated feature information that are generated to respectively correspond to T+1 single-chunk features.

Here, the action detection model may detect an action corresponding to the action class having the highest probability value, among probability values for respective action classes for a value corresponding to the current time point in the chunk-level hidden state sequence.

By means of the action detection apparatus, action detection may be efficiently and effectively performed based on features extracted using only RGB frames, excluding the use of optical flow, which requires large amounts of memory and time to extract visual information.

Further, there can be provided a method that performs fast and accurate temporal action modeling in an untrimmed streaming video including a background so as to rapidly and accurately detect the current action in the streaming video, and that elevates information about visual information related to the current action in an input video interval so as to implement fast and accurate temporal action modeling.

Furthermore, an action at a current time point may be effectively predicted by elevating features related to the current time point in consideration of relevancy to a chunk at the current time point.

In accordance with the present invention, action detection may be efficiently and effectively performed based on features extracted using only RGB frames, excluding the use of optical flow, which requires large amounts of memory and time to extract visual information.

Further, there can be provided a method that performs fast and accurate temporal action modeling in an untrimmed streaming video including a background so as to rapidly and accurately detect the current action in the streaming video, and that elevates information about visual information related to the current action in an input video interval so as to implement fast and accurate temporal action modeling.

Furthermore, an action at a current time point may be effectively predicted by elevating features related to the current time point in consideration of relevancy to a chunk at the current time point.

As described above, in the apparatus and method for action detection according to the present invention, the configurations and schemes in the above-described embodiments are not limitedly applied, and some or all of the above embodiments can be selectively combined and configured such that various modifications are possible.

What is claimed is:
1. A method for action detection, comprising:
    extracting chunk-level features for respective video frame chunks from a streaming video ranging from a past time point to a current time point, based on RGB frames;
    generating elevated feature information based on a chunk-level feature corresponding to the current time point for each of the video frame chunks; and
    detecting an action corresponding to the current time point based on the elevated feature information,
    wherein the extracting of the chunk-level features includes:
        generating a chunk-level feature sequence using single-chunk features corresponding to time points ranging from the past time point to the current time point;
    wherein the generating of the elevated feature information includes:
        generating a chunk-level feature sequence elevated in accordance with an action Instance at the current time point by sequentially inputting the single-chunk features corresponding to the chunk-level feature sequence, together with the single-chunk feature corresponding to the current time point, into information elevation units and by cyclically processing the input chunk features; and
    wherein the information elevation units include:
        a forget gage that operates to forget features with low relevancy based on past information and information at a specific time point;
        an elevation gate that generates elevated information for information related to the current time point by additionally providing information at the current time point, considering that the information forgotten by the forget gate may be related to the current time point;
        an input gate that determines and provides new information to be added based on past information and information at the specific time point; and
        an output gate that determines and provides information to be transferred to the subsequent stage from context information in which all generated information is reflected.

2. The method of claim 1, wherein extracting the chunk-level features comprises:
    dividing the streaming video into units of video segments having a fixed length;
    dividing each video segment into units of video frame chunks having a fixed length; and
    generating the chunk-level features for respective video frame chunks, and embedding the chunk-level features into respective video frame chunks.

3. The method of claim 2, wherein each video segment comprises T+1 video frame chunks including T video frame chunks corresponding to the past time point and one video frame chunk corresponding to the current time point.

4. The method of claim 3, wherein extracting the chunk-level features further comprises:
generating a single-chunk feature for each of the video frame chunks based on RGB frames extracted from the corresponding video segment, and generating a chunk-level feature sequence using T+1 single-chunk features corresponding to time points from the past time point to the current time point.

5. The method of claim 4, wherein detecting the action comprises:
calculating probabilities for respective action classes for each of the T+1 video frame chunks by inputting the elevated chunk-level feature sequence into an action detection model; and
outputting an action corresponding to the current time point in conformity with the probabilities for respective action classes of the video frame chunk corresponding to the current time point.

6. The method of claim 5, wherein the action detection model is trained by applying cross entropy loss to each of the T+1 video frame chunks.

7. The method of claim 5, wherein the elevated chunk-level feature sequence corresponds to a chunk-level hidden state sequence including elevated feature information generated in accordance with each of the T+1 single-chunk features.

8. The method of claim 7, wherein the action detection model detects the action in accordance with an action class having a highest value, among probabilities for respective action classes for a value corresponding to the current time point in the chunk-level hidden state sequence.

9. An apparatus for action detection, comprising:
a processor for extracting chunk-level features for respective video frame chunks from a streaming video ranging from a past time point to a current time point, based on RGB frames, generating elevated feature information based on a chunk-level feature corresponding to the current time point for each of the video frame chunks, and detecting an action corresponding to the current time point based on the elevated feature information; and
a memory for storing the streaming video and the check-level features for respective video frame chunks,
wherein the processor is configured to generate a chunk-level feature sequence using single-chunk features corresponding to time points ranging from the past time point to the current time point,
wherein the processor is configured to generate a chunk-level feature sequence elevated in accordance with an action instance at the current time point by sequentially inputting the single-chunk features corresponding to the chunk-level feature sequence, together with the single-chunk feature corresponding to the current time point, into information elevation units and by cyclically processing the input chunk features, and
wherein the information elevation units include:

a forget gage that operates to forget features with low relevancy based on past information and information at a specific time point,
an elevation gate that generates elevated information for information related to the current time point by additionally providing information at the current time point considering that the information forgotten by the forget gate may be related to the current time point;
an input gate that determines and provides new information to be added based on past information and information at the specific time point; and
an output gate that determines and provides information to be transferred to the subsequent stage from context information in which all generated information is reflected.

10. The apparatus of claim 9, wherein the processor is configured to divide the streaming video into units of video segments having a fixed length, divide each video segment into units of video frame chunks having a fixed length, generate the chunk-level features for respective video frame chunks, and embed the chunk-level features into respective video frame chunks.

11. The apparatus of claim 10, wherein each video segment comprises T+1 video frame chunks including T video frame chunks corresponding to the past time point and one video frame chunk corresponding to the current time point.

12. The apparatus of claim 11, wherein the processor is configured to generate a single-chunk feature for each of the video frame chunks based on RGB frames extracted from the corresponding video segment, and generate a chunk-level feature sequence using T+1 single-chunk features corresponding to time points from the past time point to the current time point.

13. The apparatus of claim 12, wherein the processor is configured to calculate probabilities for respective action classes for each of the T+1 video frame chunks by inputting the elevated chunk-level feature sequence into an action detection model and to output an action corresponding to the current time point in conformity with the probabilities for respective action classes of the video frame chunk corresponding to the current time point.

14. The apparatus of claim 13, wherein the action detection model is trained by applying cross entropy loss to each of the T+1 video frame chunks.

15. The apparatus of claim 13, wherein the elevated chunk-level feature sequence corresponds to a chunk-level hidden state sequence including elevated feature information generated in accordance with each of the T+1 single-chunk features.

16. The apparatus of claim 15, wherein the action detection model detects the action in accordance with an action class having a highest value, among probabilities for respective action classes for a value corresponding to the current time point in the chunk-level hidden state sequence.

* * * * *